United States Patent
Satoh et al.

(10) Patent No.: US 7,282,655 B2
(45) Date of Patent: Oct. 16, 2007

(54) ELECTRONIC BALANCE HAVING A POSITION CONTROL MECHANISM

(75) Inventors: Tsuyoshi Satoh, Nagaokakyo (JP); Kimitoshi Tamura, Kyotanabe (JP); Kunio Shimauchi, Kyoto (JP)

(73) Assignee: Shimadzu Corporation, Kyoto-shi (JP)

( * ) Notice: Subject to any disclaimer, the term of this patent is extended or adjusted under 35 U.S.C. 154(b) by 105 days.

(21) Appl. No.: 11/250,847

(22) Filed: Oct. 14, 2005

(65) Prior Publication Data

US 2006/0118343 A1   Jun. 8, 2006

(30) Foreign Application Priority Data

Dec. 2, 2004   (JP) ............... 2004-350452

(51) Int. Cl.
    *G01G 7/00*   (2006.01)
(52) U.S. Cl. .................. 177/210 EM; 177/212
(58) Field of Classification Search ........ 177/210 EM, 177/212
    See application file for complete search history.

(56) References Cited

U.S. PATENT DOCUMENTS

| | | | | |
|---|---|---|---|---|
| 4,039,036 A | * | 8/1977 | Baumgartner et al. ...... | 177/212 |
| 4,802,541 A | * | 2/1989 | Bator et al. .................. | 177/212 |
| 5,115,877 A | * | 5/1992 | Komoto ...................... | 177/212 |
| 6,057,516 A | * | 5/2000 | Nakamura et al. .......... | 177/212 |

FOREIGN PATENT DOCUMENTS

JP   10-104045   4/1998

* cited by examiner

*Primary Examiner*—Randy W. Gibson
(74) *Attorney, Agent, or Firm*—Rankin, Hill, Porter & Clark LLP

(57) ABSTRACT

An electronic balance of an electromagnetic force balancing type comprises electromagnetic force generators for applying electromagnetic forces for controlling to move a balance beam in a longitudinal direction (X axis) and a horizontal direction (Y axis) orthogonal thereto, PID controllers for controlling the electromagnetic force generators by a PID control, and a three axes directions position detector for detecting displacements in three directions of X, Y axes directions of the balance beam and a gravitational force direction.

5 Claims, 2 Drawing Sheets

ELECTRONIC BALANCE HAVING A POSITION CONTROL MECHANISM

The present application claims foreign priority based on Japanese Patent Application No. 2004-350452, filed Dec. 2, 2004, the content of which is incorporated herein by reference.

BACKGROUND OF THE INVENTION

1. Technical Field

The present invention relates to an electronic balance of an electromagnetic force balancing type for measuring a load by balancing the load and an electromagnetic force applied to a balance beam by interposing a fulcrum. More particularly, the present invention relates to an electronic balance having a short distance from fulcra or an electronic balance with high accuracy.

2. Related Art

Generally, an electronic balance of an electromagnetic force balancing type is constituted such that an electromagnetic force generated by an electromagnetic force generator is operated to a balance beam engaged with a measuring pan, and the balance beam is balanced against a load operated to the measuring pan. A displacement of the balance beam is detected by a position (displacement) sensor and an amount of current supplied to a coil of the electromagnetic force generator is controlled by a servo mechanism to make a result of detecting the displacement from a base point position of the balance beam null. A magnitude of the load operated to the measuring pan, that is, a measured weight value (hereinafter, abbreviated as measured value) is calculated from the current amount required for balancing.

Here, a variation in the measured value caused by vibration of the balance beam in accordance with a disturbance vibration is preferably symmetrical on both sides of a value in correspondence with a balance point of the balance beam. Therefore, a position of balancing the balance beam, that is, an attitude of the balance beam to nullify the result of detecting the displacement by the position sensor is generally set to be horizontal. That is, the balance beam is pivotably supported centering on the fulcrum, a load point of the load to be measured operated in a vertical (gravitational force) direction and an operating point of the electromagnetic force similarly operated in the vertical direction are provided at positions respectively remote from the fulcrumby inherent distances. However, the more deviated the attitude of the balance beam from a horizontal-direction, the smaller the torque operated on the balance beam by the forces centering on the fulcrum.

When the balance beam is set to be brought into a balanced state by the horizontal attitude, the balance beam is vibrated centering on the horizontal attitude. Therefore, the current flowing in the coil is varied symmetrically centering on a current amount in correspondence with the balance point in a state of vibrating the balance beam, and an average value thereof coincides with the current amount in correspondence with the balance point.

Therefore, by setting the balance beam to bring about the balanced state by the horizontal attitude, an accurate measured value can be displayed even under an environment of a large disturbance vibration. Thus, the electronic balance of the related-art is provided with a position sensor to nullify the result of detecting a displacement in the horizontal state (See JP-A-10-104045).

Although the electronic balance of the related-art is constituted as described above, there is a case in which the balance beam of the electronic balance is displaced in a direction other than the gravitational force direction by transportation or an ageing change of the electronic balance or an external vibration. When such a situation is brought about, sensitivity and linearity of the electronic balance is changed from those in adjusting the electronic balance and in accordance therewith, high accuracy is deteriorated or measurement at high speed and with high stability cannot be carried out by external vibration. There poses a problem that particularly in the case of an electronic balance having a short distance from fulcra or a highly sensitive electronic balance, an influence thereby is considerable.

SUMMARY OF THE INVENTION

An object of the present invention is to provide an electronic balance in which a position of a balance beam is not displaced other than in a gravitational force direction by transportation or an ageing change thereof.

In order to achieve the above-described object, an electronic balance of the invention is an electronic balance for operating an electromagnetic force generated by flowing a current to a coil placed in a magnetic field of a permanent magnet and a load of a measured object to a balance beam by interposing a fulcrum and calculating the load from the current flowing in the coil for generating the electromagnetic force balanced with the load, the electronic balance comprising a position control mechanism for maintaining a specific position(s) in a longitudinal direction of the balance beam or a horizontal direction orthogonal thereto or in both directions thereof constant.

The electronic balance of the invention is constituted as described above and therefore, a change in a sensitivity or a change in linearity by displacing the balance beam or vibration of the balance beam by external vibration can be reduced In the electronic balance of the invention, the position control mechanism may comprise a displacement detector for detecting displacements in the longitudinal direction and the horizontal direction of the balance beam, electromagnetic force generators for generating electromagnetic forces for controlling the balance beam in the longitudinal direction and the horizontal direction, and a control portion for controlling the electromagnetic force generators based on the displacement result from the displacement detector.

The displacement detector may include a movable member fixed to the balance beam and moved along with movement of the balance beam, and a detector for detecting a position of the movable member.

For example, the movable member is a magnetic member and the detector includes magnetic sensors for detecting a change in a magnetic field changed in correspondence with a position in the longitudinal direction and horizontal direction of the magnetic member.

Further, the displacement detector may include photoelectric type position sensors each of which detects the longitudinal direction or the horizontal direction.

The electronic balance according to the invention is provided with the position control mechanism for maintaining the position in the longitudinal direction of the balance beam or the horizontal direction orthogonal thereto constant. Therefore, the change in the sensitivity or the change in the linearity of the balance beam by displacing the balance beam in the longitudinal direction or the horizontal direction orthogonal thereto can be prevented. Further, vibration of the balance beam of the electronic balance by external

DETAILED DESCRIPTION OF THE INVENTION

Figure 1A:
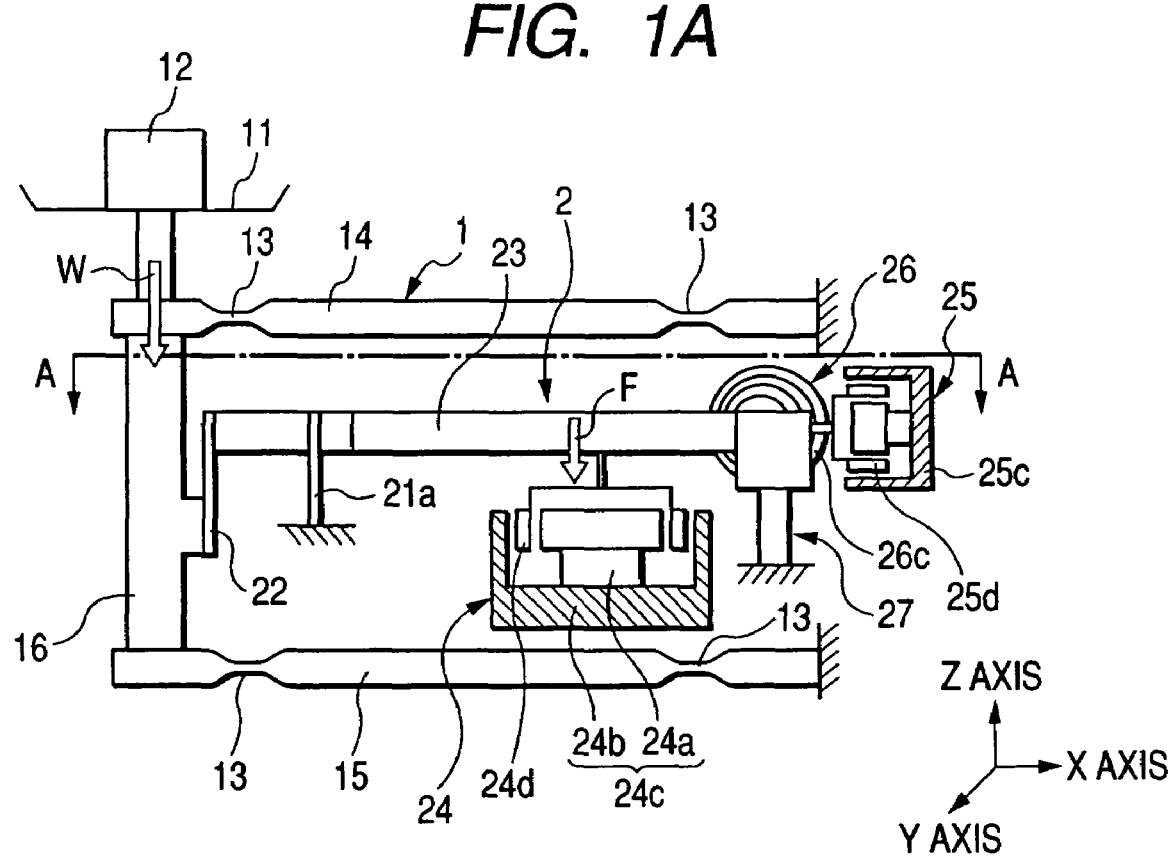
FIG. 1A illustrates a partially sectional constitution view showing a constitution of an electronic balance according to an embodiment.
Figure 1B:
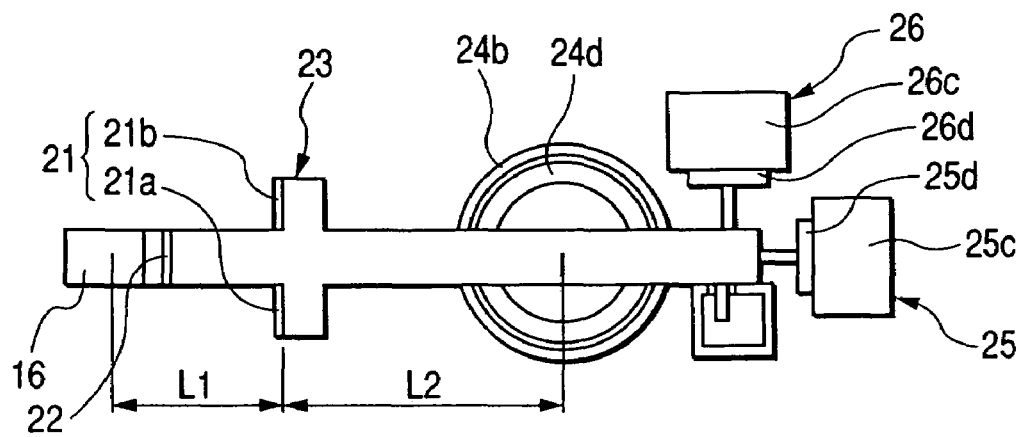
FIG. 1B illustrates a sectional view taken along a line A—A of the electronic balance of FIG. 1A.
Figure 2:
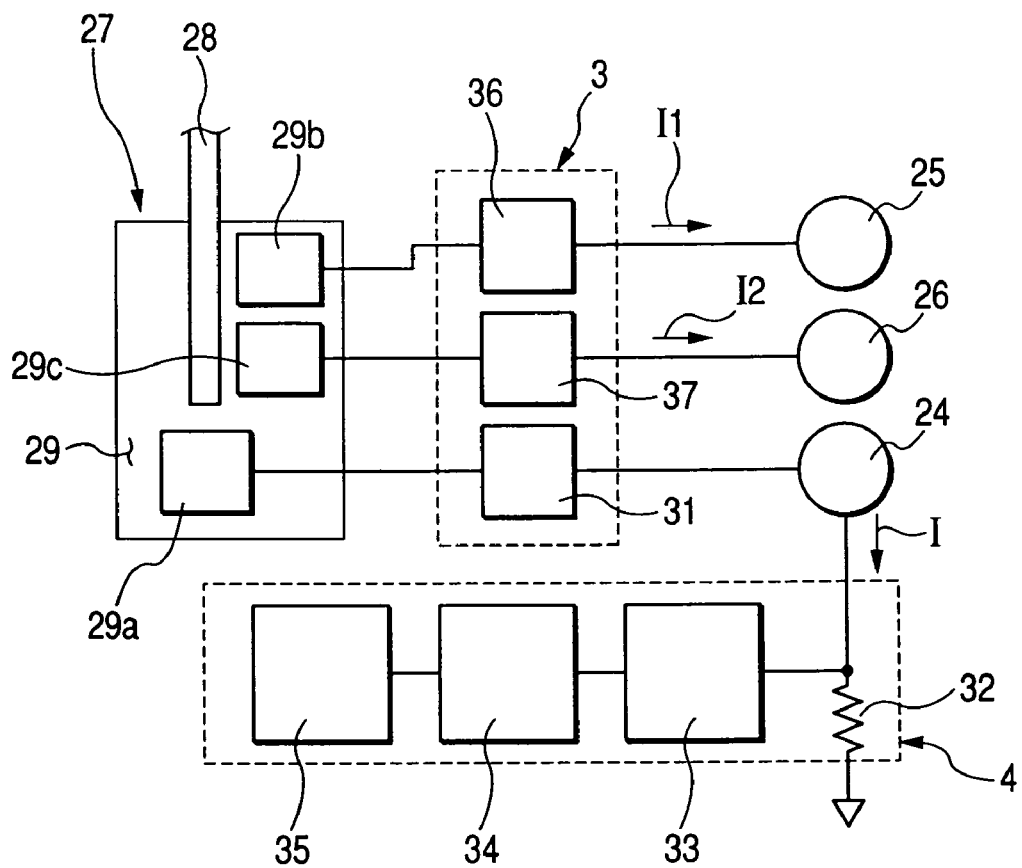
FIG. 2 is a block diagram showing a control portion 3 of a balance beam and a related portion at a surrounding thereof according to the embodiment.
Figure 3:
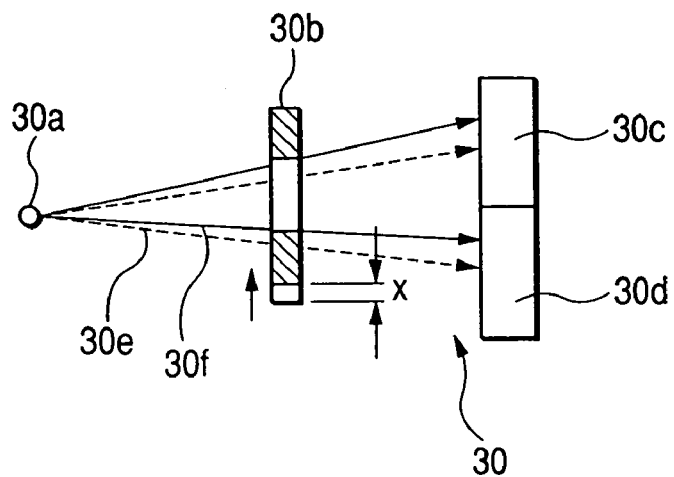
FIG. 3 is an explanatory view of operation of a photoelectric type position sensor 30 according to an embodiment.

An electronic balance of the invention will be explained in details by embodiments as follows. FIG. 1A illustrates a partially sectional constitution view showing a constitution of an electronic balance according to the invention. FIG. 1B illustrates a sectional view taken along a line A—A of the electronic balance of FIG. 1A. FIG. 2 is a block diagram showing a control portion 3 for controlling a load balancing mechanism 2 (FIG. 1A) and a display portion 4 for displaying a measured value thereof according to an embodiment.

As shown by FIG. 1 and FIG. 2, the electronic balance comprises a load transmitting mechanism 1, a load balancing mechanism 2, a control portion 3, and a display portion 4. The load transmitting mechanism 1 transmits a load-on-pan W of a measured object 12 mounted on a measuring pan 11 as vertical load to the load balancing mechanism 2. The load balancing mechanism 2 balances an electromagnetic force F, mentioned later, with the load-on-pan W transmitted via the load transmitting mechanism 1. The control portion 3 controls the load balancing mechanism 2. The display portion 4 displays the measured value of the measured object 12 obtained by inputting a coil current I for producing the electromagnetic force F and subjecting the coil current I to an operation processing.

As shown by FIG. 1A, the load transmitting mechanism 1 forms a Roberval mechanism. More specifically, two pieces of beams 14, 15, each of which is formed with thin-walled portions 13 at constant intervals, are made to be parallel upward and downward, respective one end sides of the beams 14, 15 are connected to upper and lower positions of a movable pillar 16 and respective other end sides of the beams 14, 15 are fixed. Thereby, when the load-on-pan W is applied on the movable pillar 16, the movable pillar 16 is moved in a vertical direction and the load-on-pan W is transmitted from above in the vertical direction.

Further, the load balancing mechanism 2 comprises a balance beam 23, an electromagnetic force generator 24, an electromagnetic force generator 25, an electromagnetic force generator 26, and a three axes directions position detector 27. The balance beam 23 is provided with a fulcrum 21 for supporting the balance beam 23 by spring members 21a, 21b as shown by FIGS. 1A, 1B and its one end side is connected to the movable pillar 16 by a connecting member 22. The electromagnetic force generator 24 generates the electromagnetic force F in a gravitational force direction (Z axis direction) for balancing with the load-on-pan W applied to the balance beam 23 via the movable pillar 16. The electromagnetic force generator 25 generates the electromagnetic force for controlling a position in a longitudinal direction (X axis direction) of the balance beam 23. The electromagnetic force generator 26 generates the electromagnetic force for controlling a position in a horizontal direction (Y axis direction orthogonal to the longitudinal direction of the balance beam 23. The three axes directions position detector 27 detects the displacement in the three axes directions of the balance beam 23.

The electromagnetic force generator 24 comprises a magnetic field generating apparatus 24c combined with a permanent magnet 24a and a yoke 24b and a force coil 24d arranged in the magnetic field. The magnetic field generating apparatus 24c is fixed to a cabinet (not illustrated) of the electronic balance. The force coil 24d is hung on the balance beam 23. Further, the electromagnetic force generators 25, 26 are smaller than the electromagnetic force generator 24 and provided with functions the same as that of the electromagnetic force generator 24. Force coils 25d, 26d are respectively attached fixedly to a front end side and a side face side of the balance beam 23, and magnetic field generating apparatus 25c, 26c are fixed to the cabinet.

A position of the balance beam 23 is always controlled by a position control mechanism comprising the three axes directions position detector 27, the control portion 3 and the electromagnetic force generators 24, 25, 26 shown in the block diagram of FIG. 2 so that it constitutes a horizontal position with regard to the gravitational force direction (z axis direction) and an initial adjusting position with regard to X, Y axes directions. The three axes directions position detector 27 comprises a movable member 28 fixed to the balance beam 23 and moved along with movement of the balance beam 23, and a detector 29 fixed to the cabinet for detecting a position of the movable member 28. For the movable member 28, for example, a magnetic member is used. For the detector 29, three pieces of magnetic sensors 29a, 29b, 29c capable of detecting a change in a magnetic field changed in correspondence with a position in X, Y, Z axes directions of the magnetic member 28 as a position signal are used.

As shown by FIG. 1, FIG. 2, a displacement in the gravitational force direction of the balance beam 23 produced by balancing rotational moments of the load-on-pan W and the electromagnetic force F is detected by the magnetic sensor 29a of the detector 29. A detected signal of the magnetic sensor 29a is compared with a set value (not illustrated) in a PID controller 31 and a deviation signal thereof is converted into the coil current I added with PID operation. The coil current I is supplied to the force coil 24d of the electromagnetic force generator 24 and a resistor 32 connected in series therewith and is controlled such that the balance beam 23 is disposed at a horizontal position in a state of balancing the rotational moments of the load-on-pan W and the electromagnetic force F.

When distances from the fulcrum 21 of the balance beam 23 to operating points of the load-on-pan W and the electromagnetic force F are respectively designated by notations $L_1$, $L_2$, a length of the force coil 24d is designated by notation L, a magnetic force density is designated by notation B, and a proportional constant is designated by notation K, the load-on-pan W is in proportion to the coil current I as shown by Equation (1) shown below.

$$W = KBL(L_2/L_1)I \tag{1}$$

As shown by FIG. 2, the display portion 4 comprises a resistor 32, an A/D converter 33, a digital filter 34, and an operation processing portion 35. The A/D converter 33 converts a voltage generated by the coil current I flowing in the resistor 32 into a digital value. The digital filter 34 smoothes a variation in the converted digital value. The operation processing portion 35 operates to process the smoothed digital value to convert into the measured value and displays the measured value on a display screen of a liquid crystal or the like. The load-on-pan W operated by Equation (1) is displayed.

Further, a position in X axis direction of the balance beam 23 is detected by the magnetic sensor 29b, a detecting signal thereof is compared with a set value in a PID controller 36 and is converted into a coil current I1 with PID operation in proportion to a deviation signal thereof. The coil current I1 is supplied to the force coil 25d of the electromagnetic force generator 25 and is controlled such that the balance beam 23 is not displaced in X axis direction.

Further, a position in Y axis direction of the balance beam 23 is detected by the magnetic sensor 29c, a detecting signal thereof is compared with a set value by a PID controller 37 and is converted into a coil current I2 with PID operation in proportion to a deviation signal thereof. The coil current I2 is supplied to the force coil 26d of the electromagnetic force generator 26 and is controlled such that the balance beam 23 is not displaced in Y axis direction.

By the above-described constitution and operation, the displacements in X axis, Y axis directions of the balance beam 23 are maintained constant, and therefore, the state of the position in initially adjusting the balance beam 23 is maintained, the rotational moments of the load-on-pan W and the electromagnetic force F are accurately balanced. Also external vibrations in X, Y axis directions are forcibly returned to the state of the position in initial adjustment and therefore, also vibration of the balance beam 23 is restrained and a variation in the measured value is considerably reduced.

The electronic balance of the invention is constituted as described above and is characterized in accurately balancing the load-on-pan W and the electromagnetic force F applied in the gravitational force direction by removing an influence of an ageing change or external vibration by nullifying displacements from those in the initial adjustment by adding electromagnetic forces from the electromagnetic force generators 25, 26 to the balance beam 23 in both or either one of X axis, Y axis directions. The present invention is not limited to the constitution shown in the embodiment. For example, positions in three axes directions may individually be detected by changing the three axes directions position detector 27 to, for example, a photoelectric type position sensor for detecting a displacement in one direction.

For example, in a photoelectric type position sensor 30, when a slit 30b is changed by X in an arrow mark direction, fluxes of light ray incident on light receiving elements 30c, 30d from a light source 30a are moved from light ray 30e indicated by a dotted line to light ray 30f indicated by a bold line and a difference between output electric signals of the light receiving elements 30c, 30d is in proportion to displacement of the slit 30b.

The invention is used in an electronic balance of an electromagnetic force balancing type for measuring a load by balancing the load applied on a balance beam and an electromagnetic force interposing a fulcrum, particularly in an electronic balance having a short distance from fulcra or an electronic balance with high accuracy.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

We claim:

1. An electronic balance for operating an electromagnetic force generated by flowing a current to a coil placed in a magnetic field of a permanent magnet and a load of a measured object to a balance beam by interposing a fulcrum, and calculating the load from the current flowing in the coil for generating the electromagnetic force balanced with the load, said electronic balance comprising:
   a position control mechanism for maintaining at least one of a specific position in a longitudinal direction of the balance beam or a specific position in a horizontal direction orthogonal to the longitudinal direction constant.

2. The electronic balance according to claim 1, wherein the position control mechanism comprises a displacement detector for detecting displacements in the longitudinal direction and the horizontal direction of the balance beam, electromagnetic force generators for generating electromagnetic forces for controlling the balance beam in the longitudinal direction and the horizontal direction, and a control portion for controlling the electromagnetic force generators based on the displacement result from the displacement detector.

3. The electronic balance according to claim 2, wherein the displacement detector includes a movable member fixed to the balance beam and moved along with movement of the balance beam, and a detector for detecting a position of the movable member.

4. The electronic balance according to claim 3, wherein the movable member is a magnetic member and the detector includes magnetic sensors for detecting a change in a magnetic field changed in correspondence with a position in the longitudinal direction and horizontal direction of the magnetic member.

5. The electronic balance according to claim 2, wherein the displacement detector includes photoelectric type position sensors each of which detects the longitudinal direction or the horizontal direction.

* * * * *